(12) United States Patent
Dossas et al.

(10) Patent No.: US 7,558,671 B2
(45) Date of Patent: Jul. 7, 2009

(54) UBIQUITOUS PERSONAL INFORMATION DEVICE

(75) Inventors: Vasilios D. Dossas, Chicago, IL (US); Clifford Kraft, Naperville, IL (US)

(73) Assignee: Oro Grande Technology LLC, Naperville, IL (US)

( * ) Notice: Subject to any disclaimer, the term of this patent is extended or adjusted under 35 U.S.C. 154(b) by 542 days.

(21) Appl. No.: 11/334,022

(22) Filed: Jan. 18, 2006

(65) Prior Publication Data

US 2007/0168124 A1 Jul. 19, 2007

(51) Int. Cl.
G01C 21/30 (2006.01)
G01S 1/00 (2006.01)
G06F 19/00 (2006.01)

(52) U.S. Cl. .................. 701/213; 701/211; 701/214; 340/995.13

(58) Field of Classification Search ............. 701/207, 701/209, 213, 214, 200; 702/188; 706/15, 706/45, 46, 41; 342/357.06, 357.11; 340/426.13
See application file for complete search history.

(56) References Cited

U.S. PATENT DOCUMENTS 6,529,827 B1 * 3/2003 Beason et al. ............... 701/213
7,406,379 B2 * 7/2008 Volk et al. ................... 701/200
2004/0054460 A1 * 3/2004 Walters et al. .............. 701/200
2005/0131639 A1 * 6/2005 Broussard et al. ........... 701/209
2007/0005243 A1 * 1/2007 Horvitz et al. .............. 701/213

OTHER PUBLICATIONS

Ad From www.rei.com Dec. 2005 "Radio/GPS" With Altimeter.
Von Mises "Theory of Flight" Chapt. 1 Equib. & Steady Flow in the Atmosphere 1945.

* cited by examiner

Primary Examiner—Tan Q Nguyen
(74) Attorney, Agent, or Firm—Clifford Kraft

(57) ABSTRACT

A handheld personal unit that can estimate a user's position in 3-dimensional space by determining a horizontal position and an altitude. GPS or assisted GPS can be used to determine the horizontal position, while barometric pressure assisted altimetry can be used to determine altitude accurately enough to localize the user to a particular floor of a particular building, and many times to a particular room. An artificial intelligence system can access one or more databases to provide data to the user that is related to the user's position in 3-dimensional space. This data can come from a database either stored in the handheld device or stored at a separate remote location. If a remote location is used to provide data and current barometric pressure (and possibly GPS assist), this station can access other remote stations, as needed, to supply the information. The handheld unit and/or the remote station can optionally access the internet to seek information related to the user's location in 3-dimensional space.

20 Claims, 6 Drawing Sheets

UBIQUITOUS PERSONAL INFORMATION DEVICE

BACKGROUND

1. Field of the Invention

The present invention relates generally to the field of personal devices and more particularly to a handheld ubiquitous personal information device.

2. Description of the Prior Art

Several handheld electronic personal devices exist and are commonly used including PDAs and smart cellular telephones. These devices contain computers, browsers, organizers, notepads, telephones, cameras, communications via wireless internet links, Ethernet and telephone as well as other features. Some of these devices contain some means for knowing their location such as GPS. None presently contain altimeters.

In the U.S., new cellular telephones now generally contain GPS receivers for use with the Emergency 911 services as mandated by Congress. Handheld phones in most other countries also contain GPS receivers. Most of these telephones do not perform normal GPS operations and do not continuously keep track of where they are. Rather these telephones usually use schemes such as assisted GPS, triangulation or other methods to help the telephone provider, and hence emergency response personnel, to determine the location of the telephone in the case of an emergency such as a 911 call. Some special services provide continuous GPS location of a handheld unit such as the VIAMOTO system by Motorola Corporation that can be found leased with rental cars. Other types of car navigation systems contain GPS receivers that perform continuous tracking such as those made by Alpine and Garmen.

Altimeters that measure atmospheric pressure to determine elevation have been in use for many years. These pressure devices are very sensitive to changes in atmospheric pressure and must be frequently adjusted to compensate for normal variations in pressure caused by weather phenomena. Without such calibration, such pressure altimeters can be off hundreds of feet vertically. three-satallite (or more) GPS can also report absolute altitude above sea level. However, it is known in the art that a GPS locked on three and even more satellites can be off by more than 50 feet vertically. This has been determined experimentally by comparing raw GPS output altitude readings against geographic benchmarks of known elevation. If less than three satellites are available, GPS cannot normally determine altitude.

Artificial intelligence systems such as expert systems, artificial reasoning, rule-driven systems and inference engines coupled to databases are known in the art to give stored information and expert or reasoned opinions based on stored information. Expert systems that can give detailed data about arbitrary geographic locations or other subjects generally need the support of a large database.

It would be advantageous to have a portable or handheld personal device that contained a cellular telephone or other communications means and could accurately track its position in 3-dimensional space with the help of raw GPS, assisted GPS, or other assisted horizontal techniques, and assisted altimetry that could accurate set the barometric pressure in an internal altimeter for the present horizontal location. This device could then access an internal or external database to provide expert analysis of all information concerning a particular location in 3-dimensional space near the earth (such as the 23rd floor at 1 North LaSalle Street in Chicago, or the 3rd level of the Denver Airport). In particular, this device could answer almost any question about the location and give any advice requested (such as "What are the options for getting to the Airport from where I am in time to catch a 4:00 PM flight. The answer could be: take a taxi or commuter train). Further information could then be given on how or where to do this including step-by-step navigation.

SUMMARY OF THE INVENTION

The present invention relates to a handheld personal information device and system that can contain a processor with memory, a bi-directional communication module, a GPS receiver and an altimeter where the processor coupled to the bi-directional communication module, the GPS receiver and the altimeter so that the device can accurately determine its location in 3-dimensional space and provide information related to its location from an internal or external database.

The present invention can be adapted to allow the GPS receiver to receive GPS assist information from a remote station via the communications module, and the altimeter to receive barometric pressure update information related to the device's location from the same or a different remote station. This allows accurate determination of 3-dimensional location quickly and regardless of changes in signal strength or weather.

The present invention can use an artificial intelligence system algorithm stored in its memory and executed on an internal processor or stored and executed remotely to information related to the location such as what is located there and its relationship to other locations. A remote database located at a remote computer can be used to supply supporting data. The remote computer can communicate with other remote computers as needed to supply requested information.

Several drawings and illustrations have been presented to aid in understanding the operation of the present invention. The scope of the present invention is not limited to what is shown in the figures.

DESCRIPTION OF THE INVENTION

The present invention relates to a personal unit, preferably handheld, that can determine a user's position in 3-dimensional space by determining a horizontal position and an altitude. In a particular embodiment, GPS or assisted GPS is used to determine the horizontal position, and barometric pressure assisted altimetry is used to determine altitude accurately enough to localize the user to a particular floor of a particular building and even to a particular room. An artificial intelligence system can access a database to provide data to a user that is related to the user's position in 3-dimensional space. This data can come from a database either stored in the handheld device or stored at a separate remote location. If a remote location is used to provide data and current barometric pressure (and possibly GPS assist), this station can access other remote stations, as needed, to supply the information. In particular, the handheld unit and/or the remote station can optionally access the internet to seek information related to the user's location in 3-dimensional space.

Figure 1:
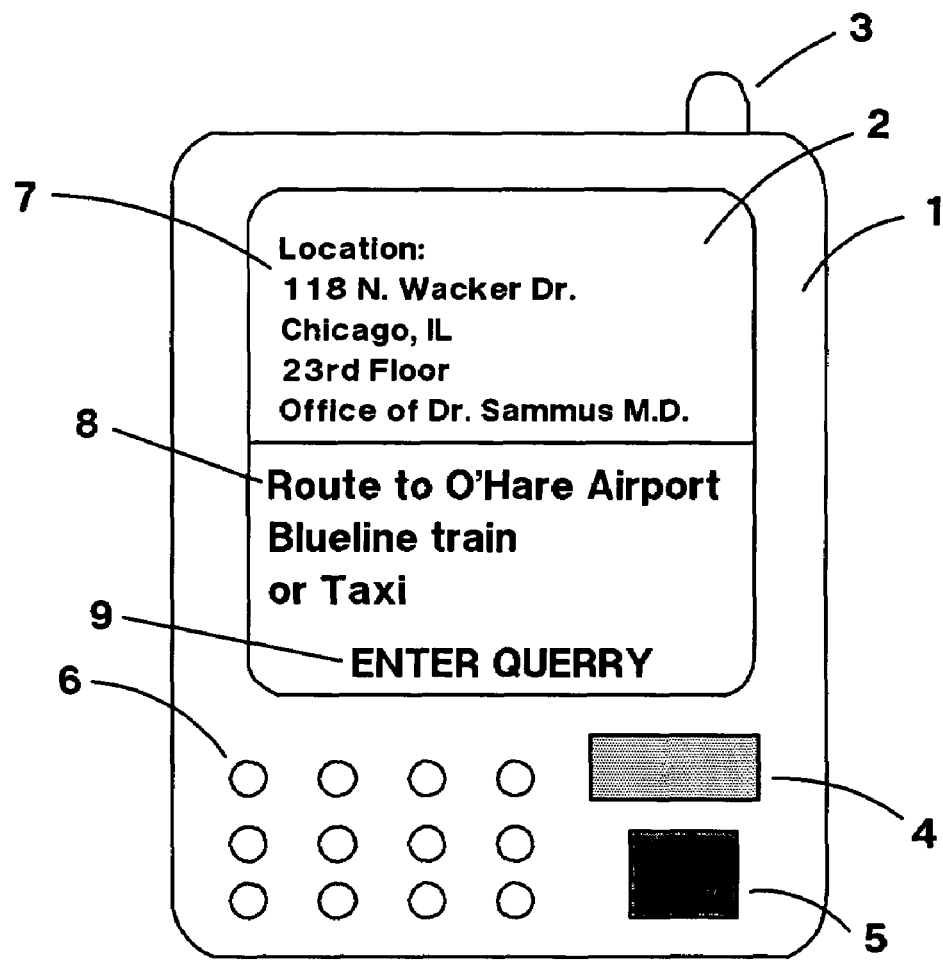
FIG. 1 shows a front view of an embodiment of the present invention.

Turning to FIG. 1, an embodiment of a handheld personal device can be seen. This device can resemble a cellular telephone or PDA. It normally includes a housing 1 with a display 2, a keypad 6, a cellular telephone, an antenna 3, a speaker 4, a microphone 5 and optionally, voice recognition and synthesis. The handheld unit can optionally also include a touch sensitive writing screen with a stylus or other means of writing a screen. FIG. 1 shows the display 2 with a location 7 shown, namely 118 N. Wacker Dr. Chicago on the 23rd floor. The present invention, in a preferred mode of operation, can continually determine its location in 3-dimensional space. As will be further explained, horizontal location can be determined by GPS, assisted GPS, differential GPS or any other location means including other future satellite or other navigation systems. The vertical location can be determined by first computing a very accurate pressure altitude. This can be done with a local barometric pressure correction from a remote station. After altitude is determined, the elevation of the 2-dimensional ground location can be found from a database. The correct height above the ground can then be computed from the altimetry data. From the height in feet or meters above the ground and a database knowledge of the type of structure at that location, the correct floor in a building can be found.

Figure 2:
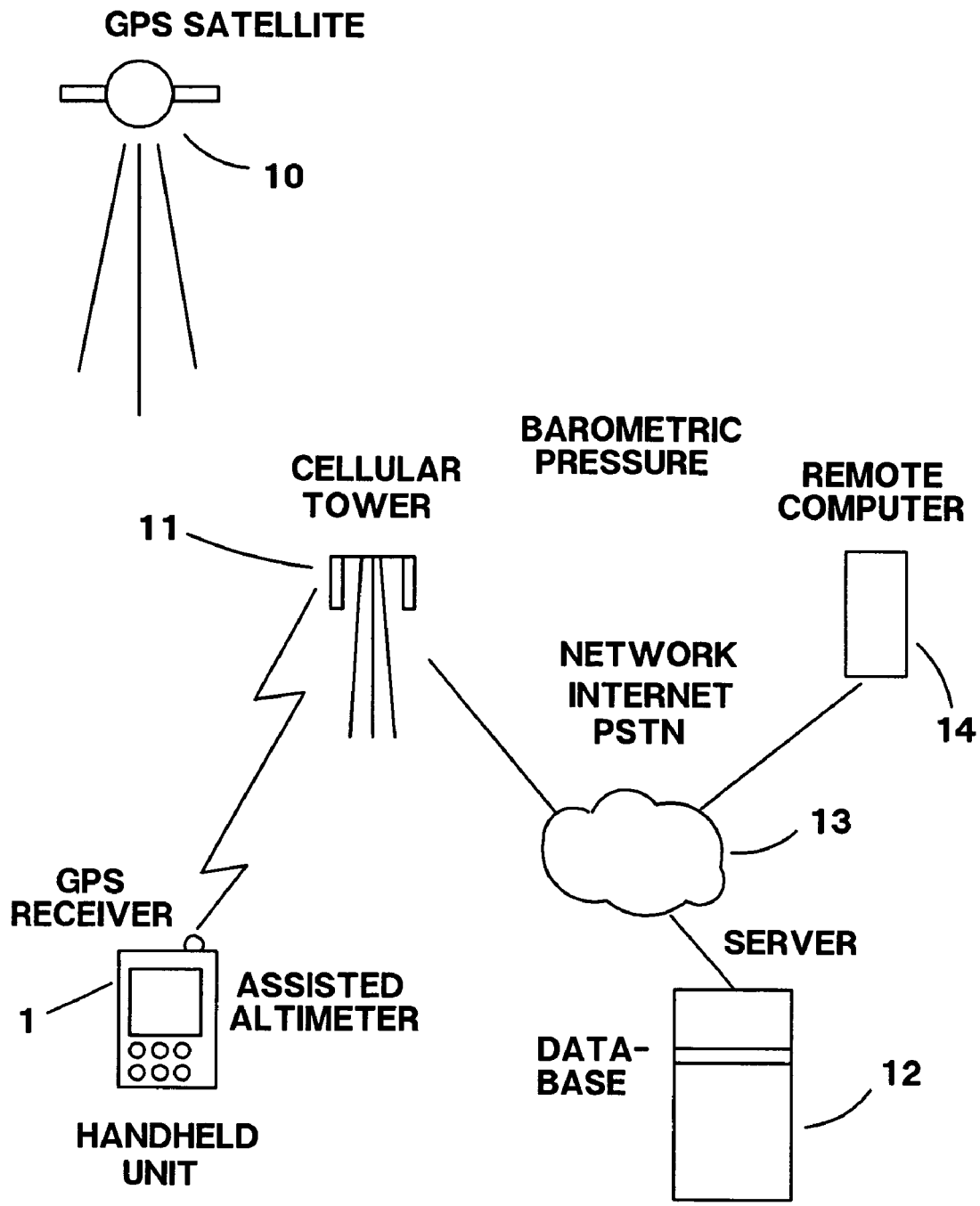
FIG. 2 shows a block system diagram showing a first and second remote station and the handheld unit including internet access.

An overview diagram of the functioning of the present invention can be seen in FIG. 2. Here a handheld personal unit 1 communicates via cellular telephone with a cellular tower 11 and associated base station (not shown). From the base station, communication can take place with at least one remote server 12 through a network 13 such as the public switched telephone network (PSTN), the internet or any other network or connection. The remote server 12 can communicate, as needed, with any number of other remote computers or servers 14 to access or acquire information as needed. In particular, local barometric pressure information can be obtained from an airport, weather station or from a national weather database. This barometric information can be transmitted to the server 12 and thence through the network 13 and cellular system to the handset 1. At the handset, the local barometric pressure can be used to calibrate the on-board pressure altimeter.

Figure 3:
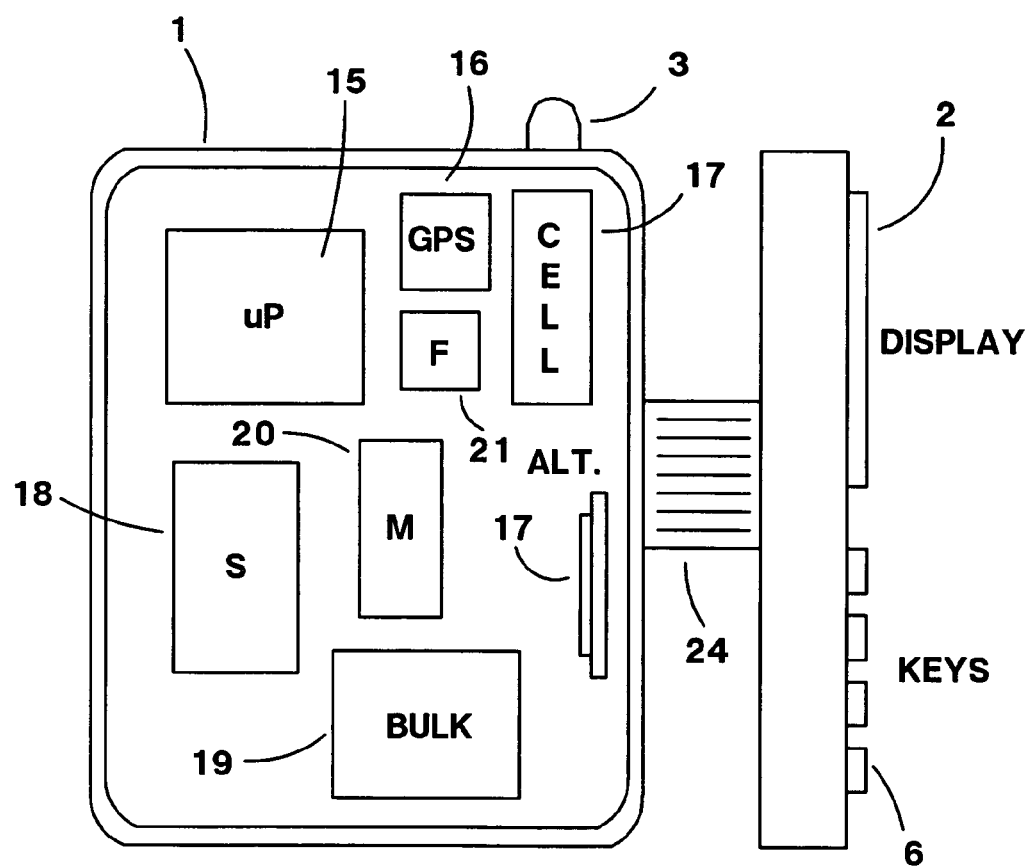
FIG. 3 shows a cover-removed view of the embodiment of handheld unit shown in FIG. 1.

An embodiment of a handset unit 1 can be seen in FIG. 3 where the front of the housing is removed and displaced. A microprocessor, micro-controller or any other processor 15 can be used to provide local intelligence for the device. The processor 15 can be operationally coupled to a RAM memory 20, flash memory 21 and/or any other memory device or devices including, but not limited to, ROMs, EPROMS, EEPROMS. Also, a bulk memory 19 such as a mini-disk or large flash memory, cartridge, cube or other memory device can provide some local database and longer term storage capability. A GPS receiver 16 that either contains an internal antenna or uses the same antenna 3 as the cellular telephone can provide direct or assisted GPS 2-dimensional location of the device in either longitude/latitude or any other coordinates relative or absolute. The cellular telephone transceiver 17 can be operationally coupled to the processor 15 and the cellular telephone 17 and memories. A pressure altimeter 17 can be used to measure altitude. The altimeter 17 can contain both an optional temperature sensor and an optional humidity sensor. These two sensors can be used to make corrections to pressure altitude. The front of the housing can be coupled via a cable 24 to a display 2, keypad 6 and microphone/speaker.

Figure 4:
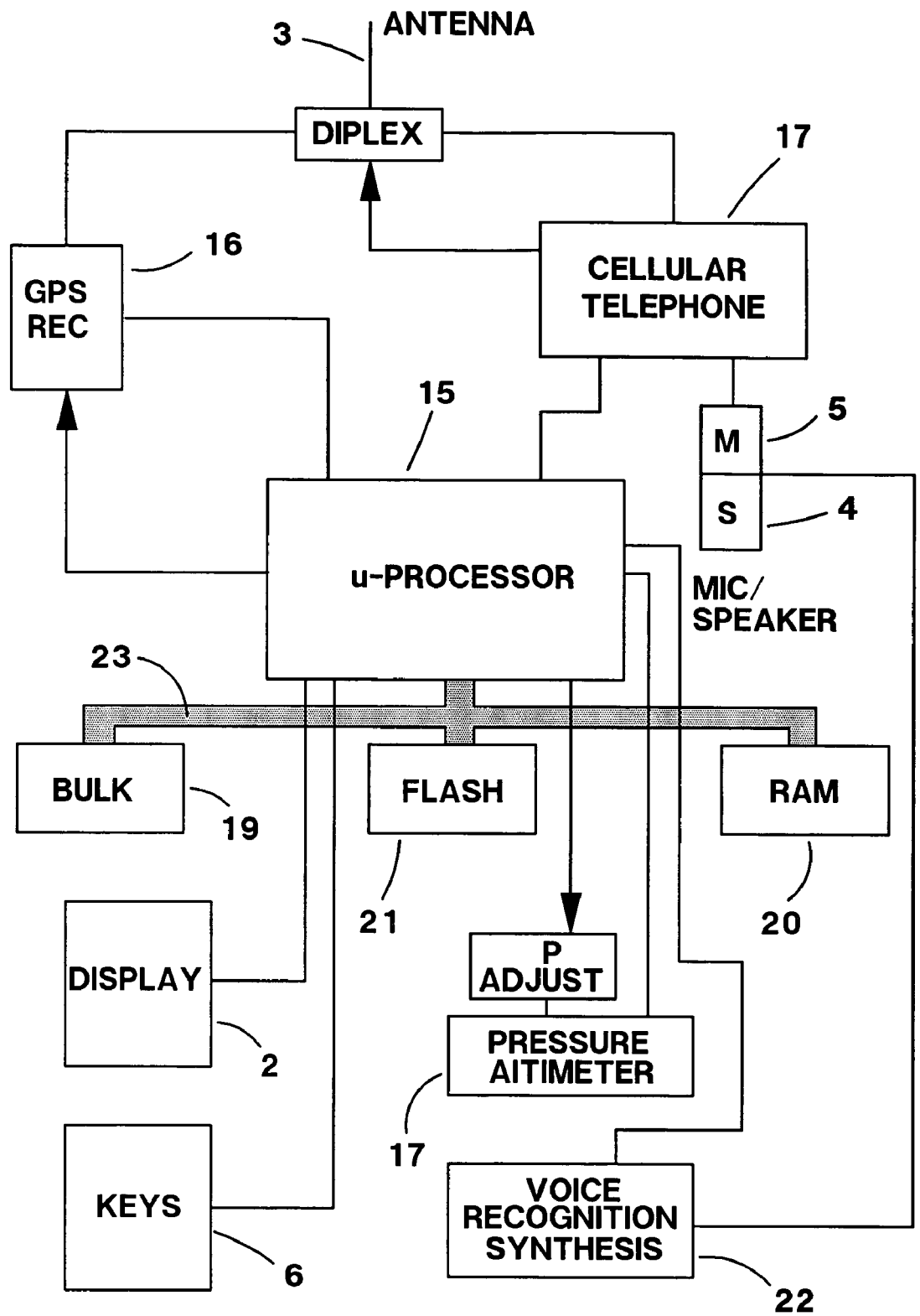
FIG. 4 shows a block diagram of an embodiment of the handheld unit.

FIG. 4 is a block diagram of an embodiment of the present invention. The processor 15 communicates via a bus 23 with a bulk memory device 19, flash memory 21, RAM memory 20, a display 2, a keypad 6 and other devices. This processing subsystem can in turn operate a cellular telephone 17, a microphone 5 and a speaker 4. Sounds from the microphone 5 can be transmitted to an optional voice recognition chip 22 for interpretation. While it is preferred for speed to perform voice recognition in a separate chip such as an ASIC, it is within the scope of the present invention to perform voice recognition in the processor 15 or elsewhere. Additionally, the present invention can include voice synthesis that can also be performed by a chip 22 or by the processor. FIG. 4 shows voice recognition and voice synthesis being performed by a single integrated chip 22. While this is the preferred method, separate chips or any combination of chips and processors can be used for voice recognition and synthesis. Synthesized voice can be sent to the speaker 4 for conversion to sound. Both voice recognition and voice synthesis are optional in the present invention.

A GPS receiver 16 can be diplexed from the cellular antenna 3 or can contain a separate antenna. This GPS receiver can receive assist information from a remote computer or service via the cellular telephone transceiver 17 in the form of frequency bins, local oscillator offset, phase and any other GPS parameter. The GPS receiver 16 can send pseudo-ranges from several satellites (usually at least 3 satellites) either to the processor 15 or to a remote station where an absolute estimated 2-dimensional location can be produced. This location can be in longitude and latitude and/or relative locations (like the corner of 5th Ave and 42nd St. in New York City. The cellular telephone transceiver 17 can also be used to make standard cellular telephone calls including data communication, photo transmission, web browsing, etc. just as any personal unit might perform.

The pressure altimeter 17 shown in FIG. 4 can contain a temperature and humidity sensor. It is known in the art of pressure altimetry to model a standard atmosphere (See R. Von Mises, "Theory of Flight", Dover 1945, Chap. 1). The standard atmosphere can be based on a first order model where the temperature is constant with altitude, and the air is completely dry. In this case, the height $h=-RT \log(p/p^*)$ is a logarithmic function of pressure (where $p^*$ is the pressure at a datum height such as sea level). This first order model can be corrected by assuming a temperature gradient with height $dT/dh=-y$(linear lapse). In this case: $h=T^*/y[1-(p/p^*)\hat{\ }yR]$ where $T^*$ is the base temperature and the symbol ˆmeans exponentiation. This is a second order model and is very accurate for heights up to several thousand feet. A third order model can be formed that also includes relative humidity (the amount of water in the air). Optionally using the temperature and humidity sensors in the altimeter assembly 17, the unit can very accurately find heights above sea level if the barometric pressure $P^*$ (equivalent sea level pressure at the location) and the base temperature $T^*$ (equivalent sea level temperature at the location) are known. The base barometric pressure for the location and the base temperature can be obtained from a remote location via the cellular telephone or other communication link. The humidity can be measured locally (the base temperature can be measured locally and computed). FIG. 4 shows a box labeled "P-Adjust" that allows both pressure, temperature to be adjusted into the altimeter 17.

Figure 5:
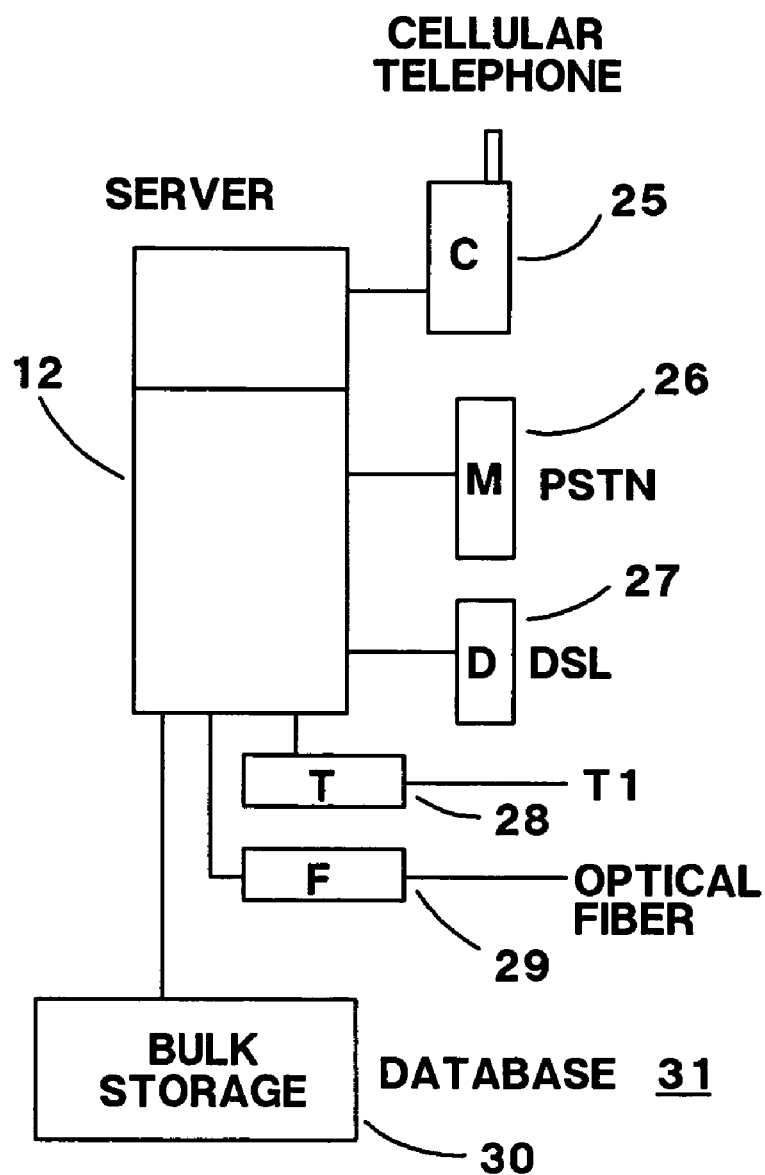
FIG. 5 shows a block diagram of an embodiment of a remote station.

Normally, according to the present invention, one or more handheld units can communicate with a remote server such as that shown in FIG. 5. The communications can take any form known in the art with the preferred method being cellular telephone. In the embodiment shown in FIG. 5, a sever computer 12 can access a bulk storage device 30 containing one or more databases 31. The databases can be distributed between various computers and locations and linked by a network, or a single database 31 can be stored and used by the single server 12. The server can be directly connected to a cellular telephone access 25 or through the PSTN 26 or by any other means of communicating with handheld units and other servers or databases. In particular, the server 12 can be connected through a modem 26, a DSL modem or DSLAM 27, a T1 interface 28, fiber optic 29 or by any other connection means. The server can connect directly into a network backbone, such as the internet, or can optionally operate through an ISP as is known in the art. The server 12 can communicate with other servers, computers and databases as needed to obtain required information.

In particular, the server 12 generally needs to determine relational data concerning the current 3-dimensional location of each handset or unit that it is servicing. As previously described, the handset's location might be at a certain longitude and latitude with an absolute altitude of 1200 feet above sea level. The server needs to first determine the land elevation at that location, say 600 feet. This puts the handset 600 feet above the ground. The server next needs to find the type of structure that might be located at that exact 2-dimensional location (such as a tall building). For example, the 2-dimensional location might be the Sears Tower in Chicago. The server (or handset) must then compute from known database data, what floor of the building is represented by a height of 600 feet. The present invention, with assisted GPS location, can locate to about 10-20 feet or less horizontally and about 10-20 feet or less vertically. This is accurate enough to place the handheld unit in one of or more offices in a building like the Sears Tower. Further refinement may be achieved by optional differential GPS, total temperature and humidity altimetry correction or other means. The database 31 can then by accessed to respond to queries from the user such as "How do I get to the airport from here?" or "How long will it take me to walk a particular path from where I am?". Commands are also possible such as: "I am leaving this office in 5 minutes, call a cab for me" or "Guide me to the cab you called."

Figure 6:
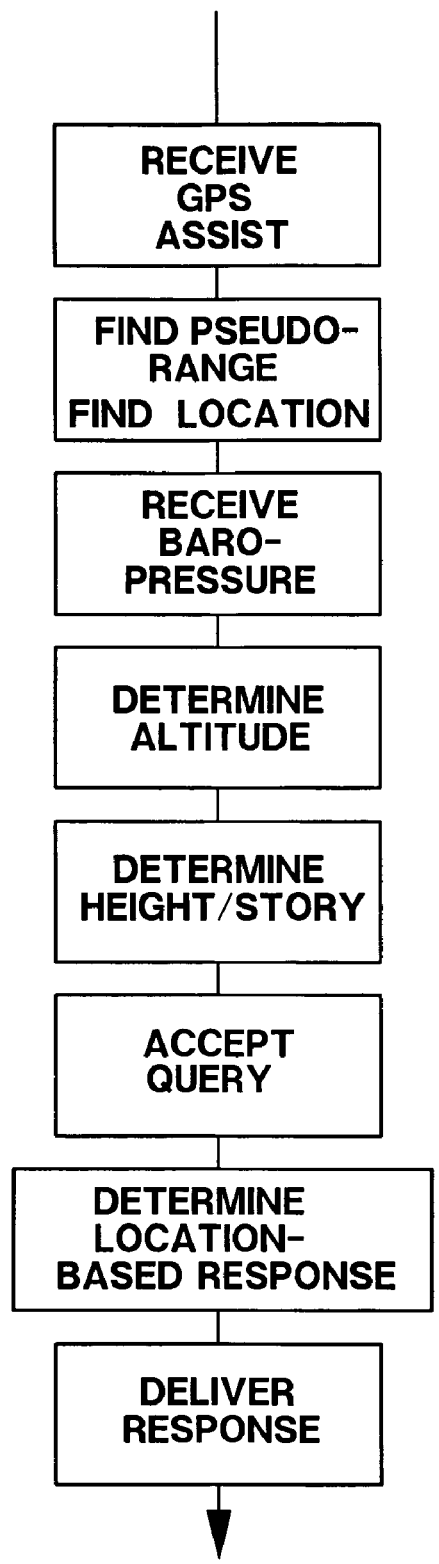
FIG. 6 shows a flow chart depicting a mode of operation of the device.

A simplified flow chart of this operation is shown in FIG. 6. Starting at the top of the figure, the handheld unit receives a GPS assist (such as frequency bins for 3 satellites and LO offset). The GPS locks the satellites, phases the pseudo-random code, and determines a pseudo-range for each satellite. The pseudo-ranges can be transmitted to a remote server, or absolute location information can be computed locally in the handset. In the preferred mode of operation, the handset can receive a GPS assist, determine and transmit pseudo-ranges to the server, and receive back either absolute or relative 2-dimensional location data. Once 2-dimensional location is established, the remote server can request local, up-to-the-minute barometric pressure for the location from the nearest weather station. The handset can then calibrate its altimeter and determine the approximate altitude above sea level (barometric pressure corrections are always offset to sea level). Once altitude is computed, height can be found by subtracting off the local ground elevation that is found in one of the databases (either in the handset or at the server).

As shown in FIG. 6, once a 3-dimensional position has been determined, the system is ready to accept queries or commands. The remote server can service these and provide responses that are location-based. The responses can be delivered by the communication system (such as the cellular telephone). An artificial intelligence system that is rule-based, an expert system, a query driven system, an inference driven system, or any other type of intelligence system, can be used both at the remote server or at the handset, or in the preferred mode, split between both the server and the handset to provide the responses. The remote server can optimally communicate with any part of the internet or any other database if necessary to answer the query.

The preferred mode of operation is to have a server serve a plurality of handset personal units. This server could continuously track the 3-dimensional location of each of them. It could then in one mode of operation continuously supply the handsets with location dependent information such as surrounding buildings, stores, emergency facilities, restrooms and any other type of location dependent information. Any user could then simply make any type of query by voice or keypad entry (such as "Direct me to the nearest restroom"). The unit could put up a map of the facility (like a Shopping mall) and give written and/or verbal directions to the requested location (the restroom). Queries could take any form that relates to location such as: "Is there a candy store in this building?" The response could be "Yes, there are two; the nearest is about 200 yards away." A further query could be: "What is its name?" The response could be "Gadiva Candies". Finally; "Direct me to it.".

Finally, knowledge of the exact location of a handset in 3-dimensional space could be supplied to subscribers or local businesses. Advertising could optionally be returned to the handset for display. For example, a store on the third level of a mall could realize that the handset was now on the third level and send an invitation to a sale.

Several descriptions and illustrations have been provided to aid in understanding the present invention. One skilled in the art will realize that many modifications, changes and variations are possible without departing from the spirit of the invention. All such modifications, changes and variations are within the scope of the present invention.

We claim:

1. A handheld personal information device comprising:
 a processor with memory;
 a bi-directional communication module, electrically coupled to said processor;
 a GPS receiver;
 an altimeter, wherein said processor requests current barometric pressure information from an external station using said bi-directional communication module and updates said altimeter with said current barometric pressure information;
 said GPS receiver and said altimeter adapted so that said device can accurately determine its location in 3-dimensions and provide information related to said location from an internal or external database.

2. The device of claim 1 further comprising said GPS receiver receiving assist information from a remote station via said communications module.

3. The device of claim 1 wherein said information related to said location includes a description of said location.

4. The device of claim 1 further comprising an artificial intelligence system algorithm stored in said memory and executed on said processor, wherein said artificial intelligence algorithm provides information related to said location.

5. The device of claim 4 wherein said artificial intelligence algorithm is an expert system.

6. The device of claim 1 further comprising a first remote database located at a remote computer, wherein said remote computer communicates with said device via said communication module, and wherein said device can access said remote database.

7. The device of claim 6 further comprising a second computer remote to both said device and said first remote computer, wherein said first remote computer can access information on said second remote computer and relay said information to said device via said communication module.

8. The method of claim 1 wherein said handheld personal information device contains a temperature sensor or a humidity sensor.

9. A handheld device and system for supplying information pertaining to a particular 3-dimensional location where said device is located comprising, in combination:
   a housing containing a processor, memory and a communications module, said memory and communications module electrically coupled to said processor;
   a GPS receiver and altimeter determining a location including horizontal position and altitude accurately enough to place said device on a particular floor of a particular building;
   an artificial intelligence algorithm for determining and reporting information concerning said location to a user.

10. The handheld device and system of claim 9 further comprising a remote station communicating with said handheld device via said communications module, said remote station containing a database.

11. The handheld device and system of claim 9 wherein said information concerning said location includes a particular floor of a building.

12. The handheld device and system of claim 9 wherein said GPS is assisted GPS.

13. The handheld device and system of claim 9 wherein said information concerning said location includes directions from said location to a second location.

14. The handheld device and system of claim 9 wherein said altimeter receives updated barometric pressure information related to said horizontal position via said communications module.

15. A method for relating information to a user related to said user's present location comprising the steps of:
    determining said user's horizontal position using GPS;
    requesting current barometric pressure information from a remote station for said user's horizontal position;
    updating a pressure altimeter with said current barometric pressure information;
    determining said user's altitude from said pressure altimeter;
    determining said user's location in 3-dimensional space using said horizontal position and altitude;
    retrieving data related to said user's location in 3-dimensional space from a database and supplying it to said user.

16. The method of claim 15 wherein said user requests specific information concerning said user's location in 3-dimensional space.

17. The method of claim 15 wherein said database is remote from said user.

18. The method of claim 15 wherein remote station supplies said data related to said user's location in 3-dimensional space.

19. The method of claim 15 wherein said remote station communicates with at least one other station remote from said first remote station to either supply said barometric pressure information or said data related to said user's location in 3-dimensional space.

20. The method of claim 15 wherein said GPS receives GPS assist information.

* * * * *